April 11, 1944.  E. L. SNYDER  2,346,402

BOX HOLDER FOR ELECTRICAL OUTLETS

Filed Nov. 20, 1940

INVENTOR.
E. L. SNYDER
BY M. Talbert Dick

Patented Apr. 11, 1944

2,346,402

UNITED STATES PATENT OFFICE 2,346,402

BOX HOLDER FOR ELECTRICAL OUTLETS

Elmer L. Snyder, Spencer, Iowa

Application November 20, 1940, Serial No. 366,394

10 Claims. (Cl. 220—3.9)

The principal object of my invention is to provide a box holder for electrical outlets consisting of bendable flanges strung on a wire or other support which may be put in place on the studding of the structure before the lath or other surface is put on, and which has bendable ears thereon for holding the outlet boxes in position.

A further object of this invention is to provide a holding means for electrical outlet switch and connecter boxes which may be put in place during construction of the building or other structure, adjusted to the proper position and then clamped onto an electrical outlet box for holding it in the selected position, thus simplifying the installation of such outlet boxes.

A still further object of this invention is to provide flanges for securing an electrical outlet box which will securely hold the outlet box in position and one which is self-aligning.

A still further object of this invention is to provide a box holder for electrical outlets that is extremely economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a front elevational view of the box holder with a box installed therein and attached to the studding of a structure before the lath or other surface is put on.

Heretofore it has been the practice to hold ordinary electrical outlet boxes in position, then build a wooden box or other support around them and attempt to place the outlet box straight on this structure thus built up. This has made it very difficult to align wall boxes for convenience outlets in the walls of houses and has necessitated considerable extra work in the securement and alignment of these metallic outlet boxes. Furthermore, the box had to be put in immediately before the lathing of the structure could be effected in order that suitable space would remain for the outlet box. Inasmuch as such wall boxes are generally placed between the studding of the structure, there is no support for the box to be secured to and this must be constructed at a considerable expense in time and labor. I have overcome such disadvantages as will be appreciated and as will be hereinafter more fully set forth.

Figure 1:
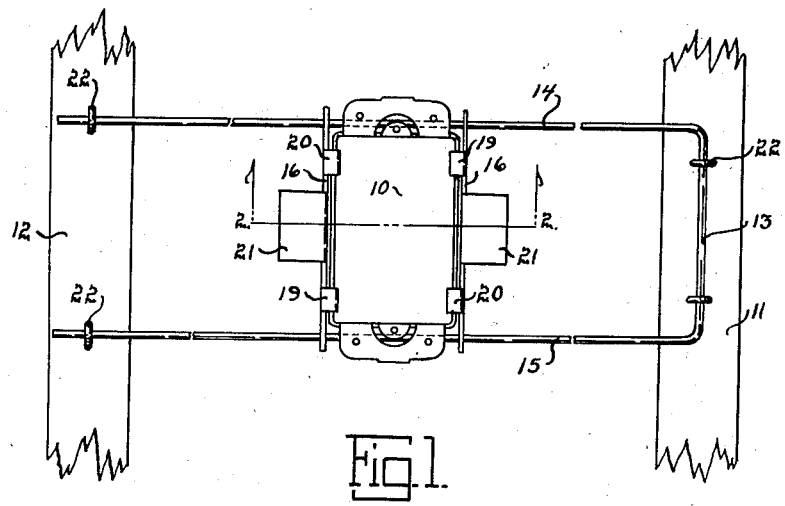
Figure 2:
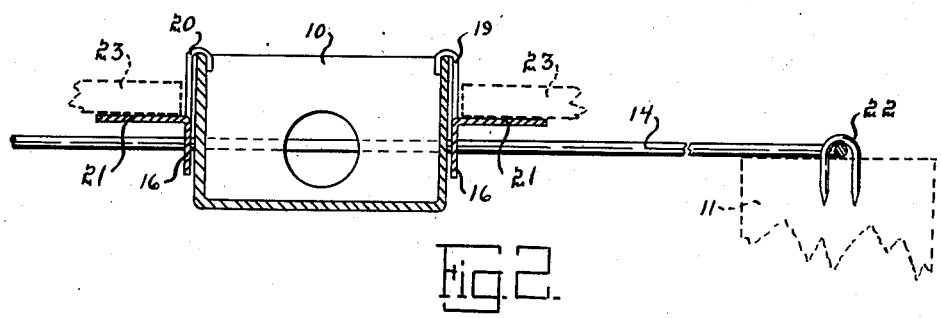
Fig. 2 is an enlarged end sectional view of an electrical outlet box and my box holder taken on the line 2—2 of Fig. 1.
Figure 3:
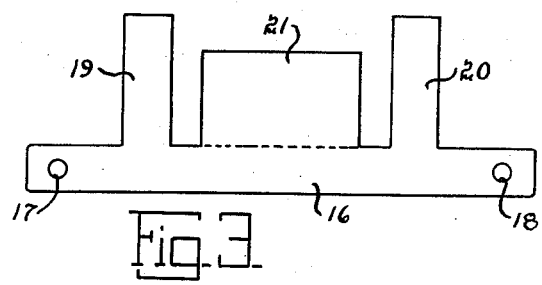
Fig. 3 is an enlarged plan view of one of the holding flanges of my device.

Referring to the drawing, I have used the numeral 10 to designate an ordinary electrical outlet box designed to hold a switch outlet or other electrical fixture. The numerals 11 and 12 indicate the studding of an ordinary frame structure. It is to such a structure and in combination with such a box that I use my device, which I will now describe. The numeral 13 indicates a U-shaped piece of wire, or the like having the two long parallel side members 14 and 15. Said U-shaped member 13 with the two parallel members 14 and 15 forms a supporting member. The holding flanges of my device, of which there are two, are composed of an elongated body member 16 having cut adjacent its end portions the holes 17 and 18 and the outwardly extending elongated bendable clamping members 19 and 20 respectively as shown in Fig. 3 of the drawing. The numeral 21 indicates a supporting flange formed in the body portion 16 and capable of being bent at right angles to the body portion as shown in Fig. 2 of the drawing. Two of such members are strung on the wire member 13 so that the flanges 21 point outwardly in opposite directions and so that the wire legs 14 and 15 are extended through the holes 17 and 18 of the body members 16. The wire member 13 is then secured to the studdings 11 and 12 by means of ordinary staples or the like 22, after which the lathing is secured to the studding and extends up to and rests upon the flanges 21 in the manner shown in Fig. 2. Such lathing I have designated by the numeral 23. The box 10 is then put in place between the two flanges 16 and the upper ends of the bendable ears 19 and 20 are crimped over the side marginal edges of the boxes as shown in Figs. 1 and 2 of the drawing.

In practical use, the U-member 13 is fastened to the studding of the structure at the location of the switch. Two of the flange members 16 are strung thereon as herebefore described and the parallel portions 14 and 15 are fastened to an adjacent stud. The wires 14 and 15 being flexible permit any adjustment desired. The box is then placed in position and the bendable ears 19 and 20 are crimped securely over the side marginal edges of the box, thereby holding the box in position. When the lath is fastened to the studding, it rests on the flanges 21 and behind the ordinary ear flanges of the box 10 itself. This simplifies the installation of wall outlet boxes and eliminates the necessity of building a make-shift frame-work to support the boxes, which extra work causes considerable delay and expense and necessitates considerable labor on the part of the carpenter and electrician on the job. It is a very simple matter for the carpenter or electrician to staple the U-member to the studding of the structure and the assembly is flexible and versatile in its adaptation to varying conditions and structures.

Thus it will be seen that I have provided a holding means for electrical outlet boxes which fulfills all of my objects and presents many more obvious advantages. My device is simple to use, is economical in structure and can be used on any type of structure.

Some changes may be made in the construction and arrangement of my improved box holder for electrical outlets without departing from the real spirit and purpose of my invention, and it is my intention to cover by my claims any modified forms of structure or use of mechanical equivalents which may be reasonably included within their scope.

I claim:

1. In a holding means for electrical outlet boxes, a U-shaped member, holding flanges each slidably threaded onto the generally parallel arms of said U-shaped member and comprising, a body portion, and a plurality of bendable ear elements designed to be bent over the side marginal edges of an outlet box for holding it in position.

2. In a device of the class described including an electrical outlet box, a supporting member designed to be secured to a supporting structure, securing elements continuously slidably mounted on said supporting member and each comprising, a body portion, at least one bendable ear member extending from said body portion designed to supportingly engage an electrical outlet box disposed between said securing elements, and a supporting flange extending outwardly from said body portion away from said electrical outlet box adapted to engage wall structure.

3. In a device of the class described, an elongated U-shaped supporting member designed to be secured to a supporting structure, two box holding elements each slidably mounted on the generally parallel legs of said elongated U-shaped supporting member and each having ear members capable of being bent for holding an electrical outlet box between said two box holding elements.

4. In a device of the class described, an elongated U-shaped supporting member designed to be secured to a supporting structure, two box holding elements each slidably mounted on the generally parallel legs of said elongated U-shaped supporting member and each having ear members capable of being bent for holding an electrical outlet box between said two box holding elements, and each also having a supporting flange extending outwardly from said outlet box and designed to support the finishing material of said supporting structure.

5. In combination in a wall box construction adapted to be mounted upon spaced apart studs in a wall, a generally U-shaped wire supporting member, means for attaching the closed end of said U-shaped member to a stud whereby said U-shaped member may be rotated, within limits, about its closed end, two elongated plate members having perforations adjacent their end portions adapted to be threaded upon the legs of said U-shaped member in spaced apart positions, bendable fingers protruding from edges of said plate members adapted to be bent to engage and hold opposite side walls of said wall box, other means for attaching the free ends of the legs of said U-shaped member to another stud.

6. In combination in a wall box construction adapted to be mounted upon spaced apart studs in a wall, a generally U-shaped wire supporting member, means for attaching the closed end of said U-shaped member to a stud whereby said U-shaped member may be rotated, within limits, about its closed end, two elongated plate members having perforations adjacent their end portions adapted to be threaded upon the legs of said U-shaped member in spaced apart positions, bendable fingers protruding from edges of said plate members adapted to be bent to engage and hold opposite side walls of said wall box, other fingers protruding from the same edges of said plate members adapted to be bent outwardly from the wall box into positions substantially at right angles to the main bodies of the respective plates and to engage lathing and means for attaching the free ends of the legs of said U-shaped member to another stud.

7. In combination in a wall box construction adapted to be mounted upon spaced apart studs in a wall, a wall box, a generally U-shaped supporting member, means for attaching the closed end of said U-shaped member to a stud whereby said U-shaped member may be rotated, within limits, about its closed end, two elongated plate members having perforations adjacent their end portions adapted to be threaded upon the legs of said U-shaped member in spaced apart positions on opposite sides of said wall box, bendable fingers on said plate members adapted to be bent to engage and hold respectively adjacent side walls of said wall box and means for attaching the free ends of the legs of said U-shaped member to another stud.

8. In combination in a wall box construction adapted to be mounted upon spaced apart studs in a wall, a generally U-shaped supporting member, means for attaching the closed end of said U-shaped member to a stud whereby said U-shaped member may be rotated, within limits, about its closed end, two elongated members adapted to be installed in supported relationship on said U-shaped member by being inserted thereon at the open end thereof when the latter is pivoted outwardly from the studding, a wall box between said two elongated members, bendable fingers on said elongated members adapted to be bent to engage and hold respectively adjacent side walls of said wall box and means for attaching the free ends of the legs of said U-shaped member to another stud.

9. In combination in a wall box construction adapted to be mounted upon spaced apart studs in a wall, supporting structure including two generally parallel, spaced apart rails, said supporting structure being adapted to be attached to a stud at one of its ends in a manner such that its free end may be pivoted outwardly materially from the studding, two elongated members adapted to be installed in supported relationship on said parallel rails by being inserted thereon over the free end of said supporting structure when the latter is pivoted outwardly from the studding, a wall box between said two elongated members, bendable fingers on said elongated members adapted to be bent to engage and hold respectively adjacent side walls of said wall box and means for attaching the free end of said supporting structure to another stud.

10. In a wall box construction spaced apart elongated support means, a wall box and an elongated plate having a perforation adjacent each end portion, receiving a said elongated support means and having also a minimum of one finger branching from one of its edges bent about a wall of said wall box to at least aid in supporting said wall box.

ELMER L. SNYDER.